Patented Sept. 15, 1931

1,823,439

UNITED STATES PATENT OFFICE

MELVIN DE GROOTE, OF ST. LOUIS, MISSOURI, ASSIGNOR, BY MESNE ASSIGNMENTS, TO TRETOLITE COMPANY, OF WEBSTER GROVES, MISSOURI, A CORPORATION OF MISSOURI

FLOODING PROCESS FOR RECOVERING OIL FROM SUBTERRANEAN OIL BEARING STRATA

No Drawing.   Application filed April 18, 1929.   Serial No. 356,306.

This invention relates to the recovery of oil from subterranean oil sands and from oil-bearing strata, and has for its main object to provide a practicable, inexpensive process for recovering oil that is held by adsorption on subterranean oil sands, such, for example, as the sands of exhausted oil fields, or the sands of oil fields that have been tested and abandoned because they did not contain a sufficient quantity of oil to make it commercially feasible to attempt to recover the oil by conventional oil-producing methods.

Briefly described, my process consists in introducing water with which a treating agent is mixed to form an aqueous treating solution, into a number of oil wells that have ceased to be productive, and permitting said treating solution to travel through the oil sand and rise through a predetermined opening, the treating solution operating to liberate the film or coating of oil on the particles of sand, and to flush the oil off the particles of sand and carry the oil upwardly to the surface of the ground.

Oil exists in oil sands in two different states, i. e., as "free oil", that is located between the voids of the particles of sand, and as "fixed oil", which is held by adsorption on the particles of sand, and which is commonly referred to as a film of oil that adheres to the particles of sand. Free oil can be recovered by the conventional methods of producing oil, such as draining the oil in conjunction with liquid or gaseous pressure, or creating an artificial fluid or gaseous pressure in the sand bed so as to dislodge and expel the oil from the sand bed into the well, and then conduct the oil to the surface of the ground by any suitable means or method. Fixed oil, i. e., the coating or film of oil on the sand, cannot be recovered by any of the conventional methods used to produce oil, because it is held as a film surrounding the grains of sand and cannot be dislodged from the sand grains either by fluid or gaseous pressure.

I have discovered that "fixed oil", i. e., oil that is held in the form of a film by adsorption on subterranean oil sands, can be recovered at a sufficiently low cost to make the operation commercially feasible, if the oil sand with its encasement of oil is washed with an aqueous treating solution that is capable of flushing off the film of oil adhering to the sand. The same procedure that is used in the ordinary flooding process for re-working abandoned oil fields can be employed to bring the treating solution into contact with the sand, but in my process the treating solution will flush the film of oil off the sand, which liberated oil, after passing through the sand bed, can be conducted to the surface of the ground or recovered by any suitable or conventional method used to produce oil.

The treating agent that I prefer to use in practising my process is a substituted aromatic sulfonic body of the type $X\,RR'\,SO_3\,Z$, wherein X stands for a polycyclic aromatic nucleus; $RR'$ represents one or more alcohol residues, derived from an alcohol or alcohols having fewer than twelve carbon atoms each; Z is a hydrogen ion equivalent, of the kind subsequently described; $SO_3$ is the conventional sulfonic residue.

The aromatic material which is the source of the aromatic nucleus may consist of naphthalene, anthracene, naphthacene, etc. Instead of the unaltered aromatic body, derivatives may be employed, such as halogen derivatives, nitro-derivatives, hydrogenated derivatives, hydroxy derivatives, etc. If desired, the sulfonic group may be introduced into the aromatic body before the introduction of alcohol residues of the kind described; for instance, naphthalene sulfonic acid or beta-naphthol sulfonic acid may be employed. Likewise, it is sometimes desirable to introduce more than one sulfonic acid group, and thus naphthalene di-sulfonic acid or a similar di-sulfonic acid may be used, or, after the introduction of the alcohol residue or residues, the material may be converted into a di-sulfonic acid.

In a general way, the alcohol residues can be introduced into the aromatic nucleus by a number of methods. One method depends on the fact that these alcohols can be condensed with polycyclic aromatics, by treating them with strong sulfonating agents, such as sulfuric acid, oleum, chlorosulfonic acid, etc., preferably in excess at elevated temperatures, and especially in the presence of a small quantity of a phosphorus compound, such as phosphoric acid, phosphorus pentachloride, phosphorus oxychloride, etc. During such operation, sulfonation of the aromatic hydrocarbon or derivative also takes place, thus producing a sulfonated substituted aromatic compound.

Another well-known method for producing materials of the kind described is to employ the well-known Friedel and Craft reaction for introducing the substitution residue into the aromatic material. Amyl alcohol may be converted by action of a suitable phosphorus halogen compound into a suitable amyl halide, such as amyl chloride. This material can be treated with a suitable aromatic body such as naphthalene in presence of anhydrous aluminum chloride to give a substituted aromatic. Said substituted aromatic can then be sulfonated in the conventional manner to give the desired substituted aromatic sulfonic body. The procedure just described, namely, that of Friedel and Craft, will not be described further, because it is possibly the best known reaction of aromatic chemistry, and in addition the expense involved in the Friedel-Craft reaction is very high ir comparison with that employing other methods.

Still another method is to dissolve a suitable polycyclic aromatic material, such as naphthalene in an excess of sulfuric acid or a suitable sulfonating agent of the proper strength, and then pass into the same a material, such as ethylene, propylene, butylene, amylene, etc.

As is obvious, the reagent can be employed as an acid mass, that is, as the sulfonic acid. However, this is not desirable, due to the corrosive action of such acidic material. Therefore, it is desirable that the acidic material produced by any of the above methods or by any other suitable method, be neutralized with a suitable alkali. There is no objection to an excess of alkali, if desired. Suitable alkalis include the hydrates or carbonates of sodium, potassium, ammonium, calcium, magnesium, etc. Calcium and magnesium hydroxides or carbonates may be employed because the calcium and magnesium salts of many sulfonic acids of the kind described give water-soluble salts. Likewise, the acidic material can also be converted into an ester by esterification in the usual manner to produce an aromatic or aliphatic ester, such as the ethyl ester.

As indicated, the treating agent may be acidic in nature, and the substituted aromatic sulfonic group may be united with an acid hydrogen ion, as is the case where the acid itself is employed. When said acidic material is neutralized by means of basic material previously referred to, the hydrogen ion is replaced by a suitable metallic ion equivalent, such as a metallic ion or its equivalent, such as an ammonium radical. In event that the material is esterified, the hydrogen ion is replaced by an organic radical such as an ethyl radical. I will refer to the hydrogen ion or its metallic substitute or its organic substitute as the hydrogen ion equivalent, referred to in my structural formula as Z.

It has been pointed out that the reagent employed in my process is derived from an alcohol or alcohols having fewer than twelve carbon atoms each. Suitable alcohols that may be employed are methyl, ethyl, butyl, propyl, amyl, hexyl, etc. Likewise it is to be understood that this reaction is not limited to the introduction of an aliphatic alcohol, but it may also be applied to the introduction of a residue from an aromatic alcohol, such as hexahydrophenol, etc. Then, too, aralkyl alcohols may be employed, such as benzyl alcohol, or a cyclic alcohol may be employed, such as cyclo-butanol. In the introduction of two or more alcohols of the kind noted, they need not be of the same class; for instance, an aromatic alcohol such as hexahydrophenol and an aralkyl alcohol such as benzyl alcohol may be introduced into the same polycyclic aromatic nucleus.

The material may be used in any convenient strength, dissolved in any kind of water in which it will make a solution substantially free from precipitates. One advantage of many of the reagents of the kind described is that they will dissolve in hard water or salty water or in hard salty water just as readily, without undue precipitation, as in soft or distilled water.

My preferred reagent is produced in the following manner: Approximately sixty parts of isopropyl alcohol is treated with sulfuric acid in excess, so as to convert it into propyl acid sulfate. In a separate apparatus approximately 128 parts of naphthalene are treated with sulfuric acid in excess, so as to produce naphthalene sulfonic acid. The two separate masses are then mixed and allowed to remain in contact at elevated temperature and with addition of more acid if required, until propylated naphthalene sulfonic acid is produced. Sufficient water is then added so as to allow the propylated naphthalene sulfonic acid to separate as an upper layer. The lower layer of dilute acid is drawn off, and the propylated naphthalene sulfonic acid is neutralized with ammonium hydroxide to give the ammonium salt. This ammonium salt is then ready for use.

One highly desirable characteristic of my process which permits it to be used successfully, both on Pennsylvania oils and on oils of an asphaltic nature, is that the products of reaction with hard water are usually water soluble, and, accordingly, there is no liability of a precipitate being formed that will clog the oils and obstruct or impede the flow of the wash water and the oil that is liberated from the particles of sand by the action of the treating agent. The principal advantages of my process, however, are that it will not clog the sand bed on which the process is being used, it will effect the recovery from abandoned sand beds of oil that contains appreciable quantities of asphaltic or similar material, and it is enough cheaper than a flooding process employing ordinary soaps or foam-producers such as saponin, to make it feasible to use the process for recovering low priced oils.

In practising my process, I prefer to use a ratio of about 1 barrel of treating agent to 1,000 barrels of flushing water, but in some instances, a ratio of 1 to 20,000, or even 1 to 40,000 may be used. The amount of water employed can be equal to the recovered oil, or it may be many times as much. The water may be cold or preheated, if desired. The actual mechanical practice is well known, and I prefer to use the same apparatus that has been used in the Pennsylvania oil fields to practice the flooding process, or any modifications or variations of such an apparatus.

Having thus described my invention, what I claim as new and desire to secure by Letters Patent is:

1. A flooding process for recovering fixed oil from subterranean oil sands and other oil-bearing strata, which consists in flooding or washing the sand bed with an aqueous treating solution comprising a water-soluble substituted polycyclic sulfonic body of the type X RR′ SO$_3$ Z, wherein X stands for a polycyclic aromatic nucleus; RR′ represents one or more alcohol residues derived from an alcohol or alcohols having fewer than 12 carbon atoms each; SO$_3$ represents the conventional sulfonic acid residue; and Z represents a hydrogen ion equivalent.

2. A flooding process for recovering fixed oil from subterranean oil sands and other oil-bearing strata, which consists in flooding or washing the sand bed with an aqueous treating solution comprising a water-soluble substituted polycyclic sulfonic body of the type X RR′ SO$_3$ Z, wherein X stands for a naphthalene nucleus; RR′ represents one or more alcohol residues derived from an alcohol or alcohols having fewer than 12 carbon atoms each; SO$_3$ represents the conventional sulfonic acid residue; and Z represents a hydrogen ion equivalent.

3. A flooding process for recovering fixed oil from subterranean oil sands and other oil-bearing strata, which consists in flooding or washing the sand bed with an aqueous treating solution comprising a water-soluble substituted polycyclic sulfonic body of the type X RR′ SO$_3$ Z, wherein X stands for a naphthalene nucleus; RR′ represents one or more aliphatic alcohol residues derived from an aliphatic alcohol or alcohols having fewer than 12 carbon atoms each; SO$_3$ represents the conventional sulfonic acid residue; and Z represents a hydrogen ion equivalent.

4. A flooding process for recovering fixed oil from subterranean oil sands and other oil-bearing strata, which consists in flooding or washing the sand bed with an aqueous treating solution comprising a water-soluble substituted polycyclic sulfonic body of the type X RR′ SO$_3$ Z, wherein X stands for a naphthalene nucleus; RR′ represents one or more propyl alcohol residues derived from propyl alcohol; SO$_3$ represents the conventional sulfonic acid residue; and Z represents a hydrogen ion equivalent.

5. A flooding process for recovering fixed oil from subterranean oil sands and other oil-bearing strata, which consists in flooding or washing the sand bed with an aqueous treating solution comprising a water-soluble polycyclic sulfonic salt of the type X RR′ SO$_3$ Z, wherein X stands for a polycyclic aromatic nucleus; RR′ represents one or more alcohol residues derived from an alcohol or alcohols having fewer than 12 carbon atoms each; SO$_3$ represents the conventional sulfonic acid residue; and Z represents a metallic ion equivalent.

6. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR′ SO$_3$ Z, wherein X stands for a naphthalene nucleus; RR′ represents one or more alcohol residues derived from an alcohol or alcohols having fewer than 12 carbon atoms each; SO$_3$ represents the conventional sulfonic acid residue; and Z represents a metallic ion equivalent.

7. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR′ SO$_3$ Z, wherein X stands for a naphthalene nucleus; RR′ represents one or more aliphatic alcohol residues, derived from an aliphatic alcohol or alcohols having fewer than 12 carbon atoms each; SO$_3$ represents the conventional sulfonic acid residue; and Z represents a metallic ion equivalent.

8. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR′ SO$_3$ Z, wherein X stands for a naphthalene nucleus; RR′ represents one or more propyl alcohol residues derived from propyl alcohol; SO$_3$ represents the conventional sulfonic acid residue; and Z represents a metallic ion equivalent.

9. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR' $SO_3$ Z, wherein X stands for a polycyclic aromatic nucleus; RR' represents one or more alcohol residues derived from an alcohol or alcohols having fewer than 12 carbon atoms each; $SO_3$ represents the conventional sulfonic acid residue; and Z represents an ammonium radical.

10. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR' $SO_3$ Z, wherein X stands for a naphthalene nucleus; RR' represents one or more alcohol residues derived from an alcohol or alcohols having fewer than 12 carbon atoms each; $SO_3$ represents the conventional sulfonic acid residue; and Z represents an ammonium radial.

11. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR' $SO_3$ Z, wherein X stands for a naphthalene nucleus; RR' represents one or more aliphatic alcohol residues derived from an aliphatic alcohol or alcohols having fewer than 12 carbon atoms each; $SO_3$ represents the conventional sulfonic acid residue, and Z represents an ammonium radical.

12. A flooding process for recovering fixed oil from subterranean oil sands and other oil-bearing strata, which consists in flooding or washing the sand bed with an aqueous treating solution comprising a water-soluble substituted polycyclic sulfonic salt of the type X RR' $SO_3$ Z, wherein X stands for a naphthalene nucleus; RR' represents one or more propyl alcohol residues derived from propyl alcohol; $SO_3$ represents the conventional sulfonic acid residue, and Z represents an ammonium radical.

MELVIN DE GROOTE.